US009707826B2

(12) United States Patent
Brinas

(10) Patent No.: US 9,707,826 B2
(45) Date of Patent: Jul. 18, 2017

(54) AIRFLOW OUTLET

(71) Applicant: GM GLOBAL TECHNOLOGY OPERATIONS LLC, Detroit, MI (US)

(72) Inventor: Gerard Alan Brinas, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 457 days.

(21) Appl. No.: 14/448,302

(22) Filed: Jul. 31, 2014

(65) Prior Publication Data

US 2016/0031293 A1 Feb. 4, 2016

(51) Int. Cl.
*B60H 1/34* (2006.01)

(52) U.S. Cl.
CPC ............. *B60H 1/34* (2013.01); *B60H 1/3442* (2013.01); *B60H 1/3428* (2013.01)

(58) Field of Classification Search
CPC ................................ B60H 1/34; B60H 1/3442
USPC ........................................................ 454/152
See application file for complete search history.

(56) References Cited

U.S. PATENT DOCUMENTS

| 7,819,728 | B2 * | 10/2010 | Beckley | ............... | B60H 1/3407 |
| | | | | | 220/822 |
| 2011/0195650 | A1 * | 8/2011 | Uhlenbusch | ......... | B60H 1/3442 |
| | | | | | 454/152 |
| 2015/0202946 | A1 * | 7/2015 | Inagaki | ................ | B60H 1/3428 |
| | | | | | 454/154 |
| 2015/0336445 | A1 * | 11/2015 | Uehara | ................ | B60H 1/3442 |
| | | | | | 454/155 |

FOREIGN PATENT DOCUMENTS

| DE | WO 2008107070 A1 | * | 9/2008 | ........... | B60H 1/3428 |
| DE | 2407331 A1 | * | 1/2012 | ........... | B60H 1/3442 |
| DE | 10223660 B4 | * | 10/2013 | ........... | B60H 1/3442 |
| FR | 2813241 A1 | * | 3/2002 | ........... | B60H 1/3428 |
| FR | WO 2015091715 A1 | * | 6/2015 | ........... | B60H 1/3442 |
| GB | 1436838 A | * | 5/1976 | ........... | B60H 1/3442 |
| JP | WO 2014203545 A1 | * | 12/2014 | ............ | F24F 13/065 |
| WO | WO 2016048036 A1 | * | 3/2016 | ............... | B60H 1/34 |

* cited by examiner

*Primary Examiner* — Alissa Tompkins
*Assistant Examiner* — Frances F Hamilton
(74) *Attorney, Agent, or Firm* — Quinn IP Law

(57) ABSTRACT

An airflow outlet is provided. The airflow outlet may include an adjustable vane component, a backplate, and a vane housing. The adjustable vane component has a vane nexus and a connection feature extending rearwardly from the vane nexus. The adjustable vane component further includes a plurality of vanes extending outwardly form the vane nexus. The backplate has a support tube defining a bore therethrough configured to receive the connection feature of the adjustable vane component and a plurality of backplate extensions extending outwardly form the support tube. The adjustable vane component and backplate may be fitted within a vane housing. The adjustable vane component is rotatable about a central axis between a first position and a second position, such that the positioning of the adjustable vane component and the selective alignment of the vanes relative to the backplate extensions defines the amount of airflow through an airflow outlet opening.

11 Claims, 4 Drawing Sheets

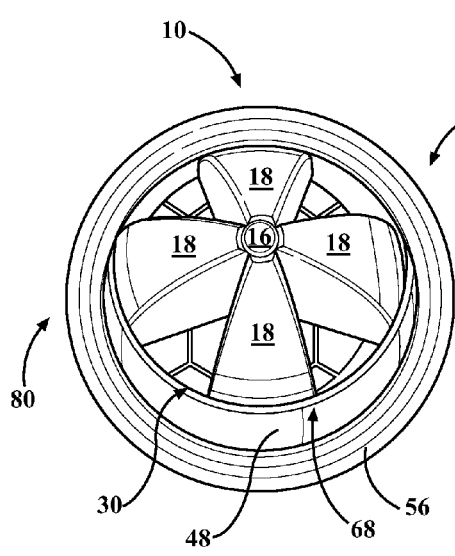
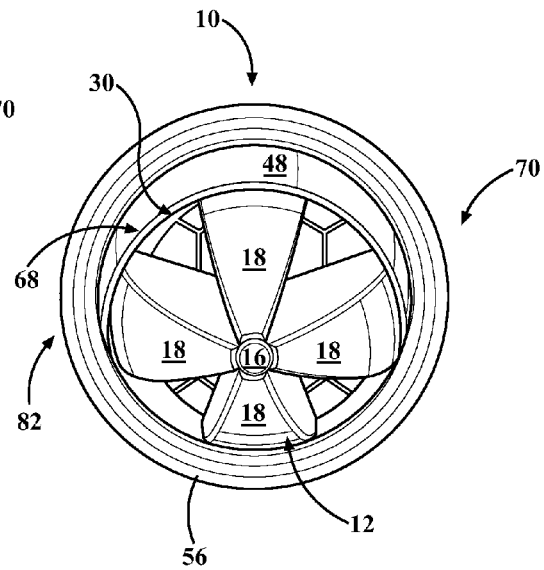
FIG. 5A  FIG. 5B
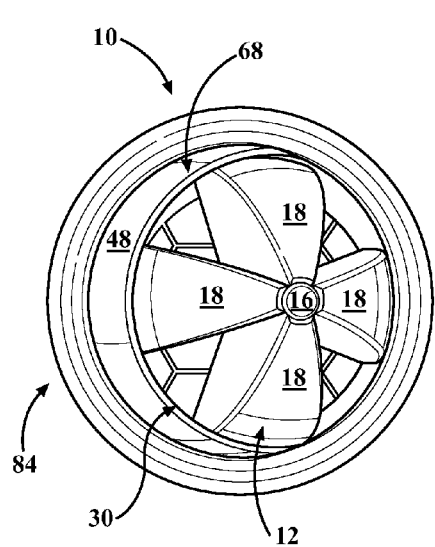
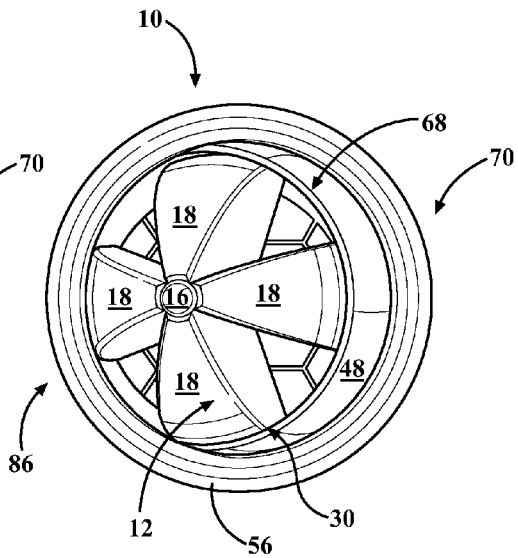
FIG. 5C  FIG. 5D

AIRFLOW OUTLET

TECHNICAL FIELD

The disclosure relates to an airflow outlet, particularly to an airflow outlet incorporated in the Heating, Ventilation, and Air Conditioning (HVAC) system of a vehicle.

BACKGROUND

Conventional vehicle interior passenger compartments include airflow systems for passenger comfort. These airflow systems deliver heated, cooled, or ambient air into the passenger compartment of the vehicle through airflow outlets.

The amount of airflow and the direction of that airflow through the outlets is generally manually controllable through the use of multiple sets of directional vanes, including at least a primary set of vanes and a secondary set of vanes. The vanes are generally controlled with thumb wheels or the like, to restrict, meter, or completely block airflow to the passenger compartment.

SUMMARY

An airflow outlet is provided. The airflow outlet may be configured for use within the HVAC system of a vehicle and designed to facilitate airflow to a vehicle passenger compartment. The airflow outlet comprises at least an adjustable vane component and a backplate.

The adjustable vane component includes a vane nexus, a connection feature extending rearwardly from the vane nexus, and a plurality of vanes extending outwardly from the vane nexus and connection feature. The adjustable vane component is rotatable about a central axis between a first position and a second position. The backplate includes a support tube, which defines a bore therethrough, and a plurality of backplate extensions that extend outwardly from the support tube.

The adjustable vane component and the backplate may be integrally coupled such that the bore of the backplate receives the connection feature of the adjustable vane component, with the connection feature being rotatable within the bore defined by the support tube.

The backplate extensions are configured to selectively align with the plurality of vanes of the adjustable vane component, as the adjustable vane component rotates about the central axis and with respect to the backplate. As such, the plurality of backplate extensions defines an airflow outlet opening through which air may flow. Simply stated, the position of the plurality of vanes with respect to the plurality of backplate extensions defines the size of the airflow outlet opening and essentially the amount of airflow through the airflow outlet.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

FIG. 5A is a schematic front view of the airflow outlet described in the present disclosure, wherein the airflow outlet is shown in a first vertical rotation position.

FIG. 5B is a schematic front view of the airflow outlet described in the present disclosure, wherein the airflow outlet is shown in a second vertical rotation position.

FIG. 5C is a schematic front view of the airflow outlet described in the present disclosure, wherein the airflow outlet is shown in a first horizontal rotation position.

FIG. 5D is a schematic front view of the airflow outlet described in the present disclosure, wherein the airflow outlet is shown in a second horizontal rotation position.

DETAILED DESCRIPTION

Referring to the Figures, wherein like reference numbers correspond to like or similar components throughout the several views, an airflow outlet 10 is provided. The airflow outlet 10 may be configured for use within the HVAC system of a vehicle, such that a plurality of outlets are arranged throughout the passenger compartment of a vehicle in order to facilitate airflow to the passenger compartment.

Figure 1:
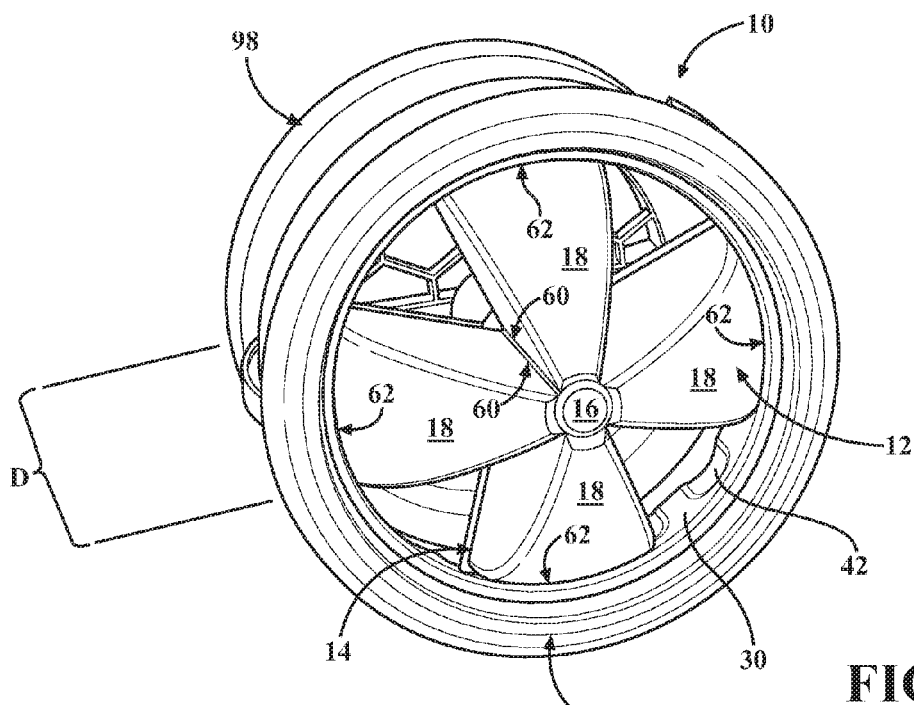
FIG. 1 is a schematic perspective view of an airflow outlet described in the present disclosure.
Figure 2:
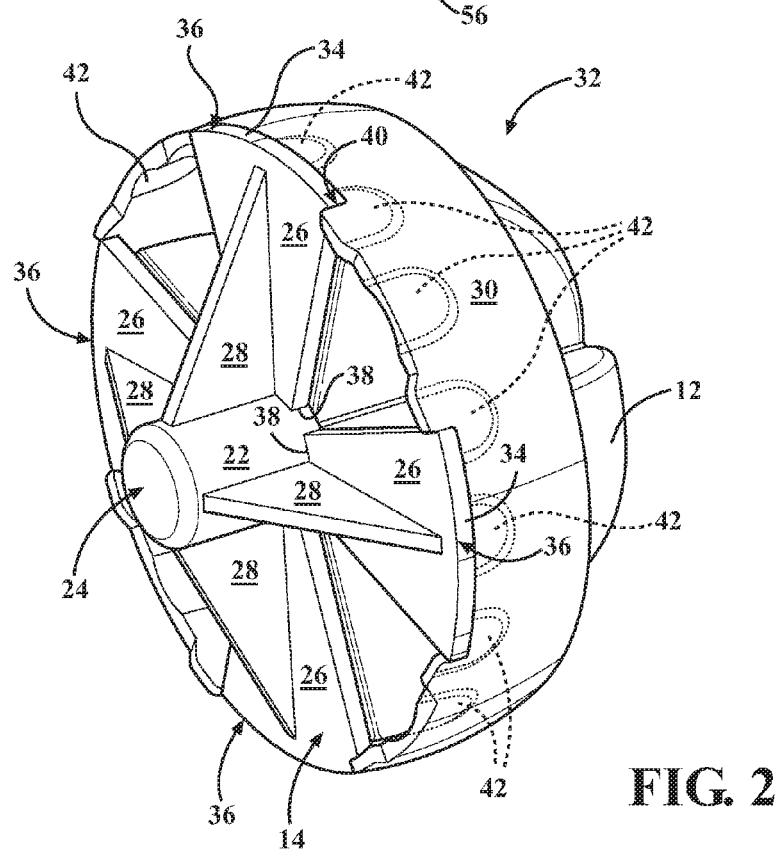
FIG. 2 is a schematic, rear, perspective view of a vane assembly of the airflow outlet.
Figure 3:
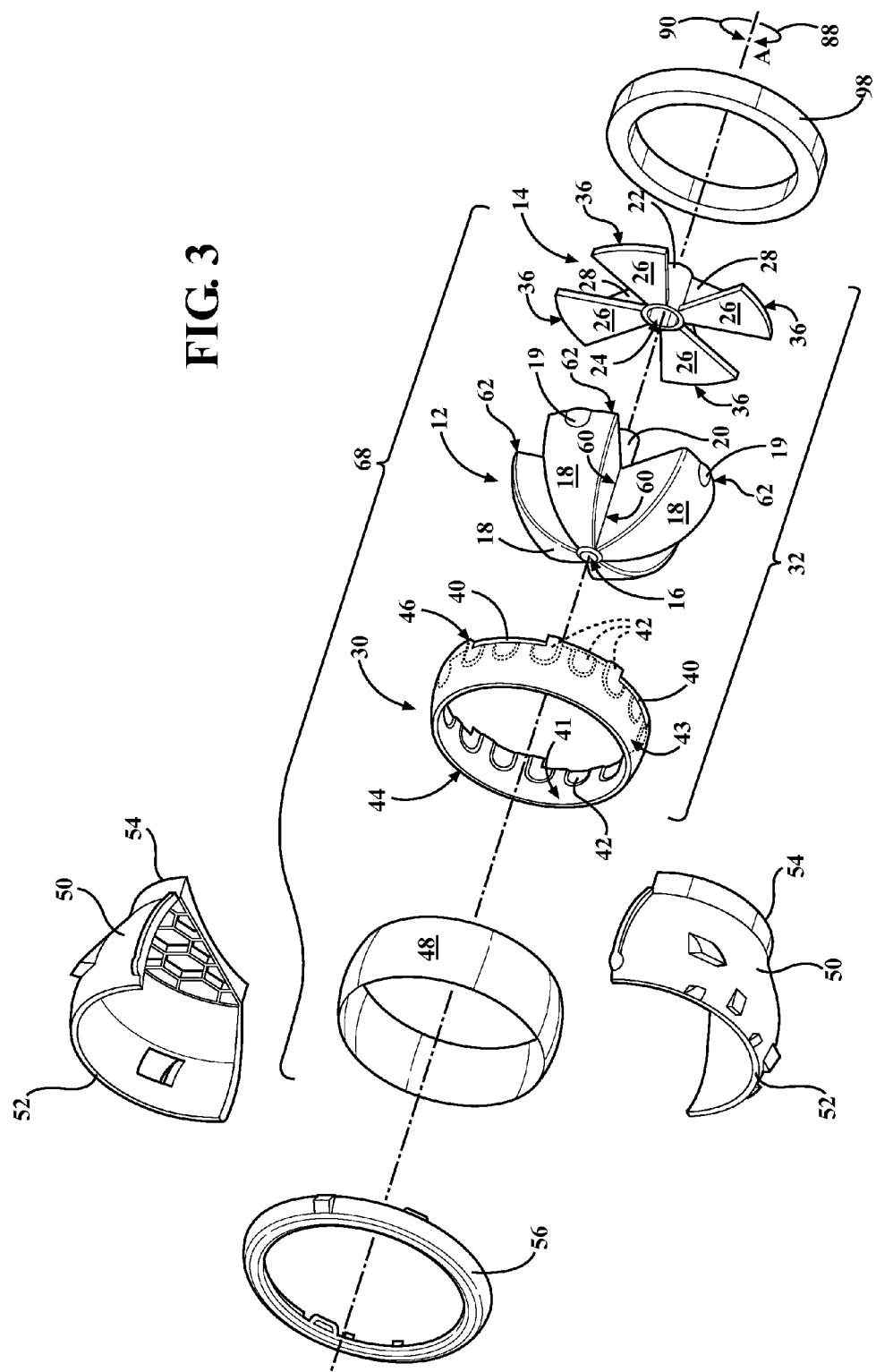
FIG. 3 is a schematic, exploded, perspective view of the airflow outlet described in the present disclosure.

The air flow outlet 10 may generally include an adjustable vane component 12 and a backplate 14. Referring specifically to FIGS. 1-3, the airflow outlet 10 includes an adjustable vane component 12. The adjustable vane component 12 may be formed or molded as a single unitary piece. The adjustable vane component 12 may be formed of a polymeric material or the like. The adjustable vane component 12 may include a vane nexus 16, a connection feature 20, and a plurality of vanes 18. The vane nexus 16 comprises the central portion of the adjustable vane component 12. As shown in FIG. 3, the connection feature 20 extends rearwardly from the vane nexus 16. The connection feature 20 may be formed as a solid rod or pin. The connection feature 20 may further be formed in a variety of circumferential shapes. For example, the connection feature 20 may be circular or polygonal in shape about its circumference.

The adjustable vane component 12 further includes a plurality of vanes 18. The plurality of vanes 18 extend outwardly from the vane nexus 16 and the connection feature 20. Each of the plurality of vanes 18 may have a proximal end 60 connected to the vane nexus 16 and the connection feature 20 and a distal end 62 removed from the vane nexus 16 and the connection feature 20. Further, each of the plurality of vanes 18 may define a positioning feature 19 thereon. The positioning feature 19 may be formed on and defined by the distal end 62 of each of the plurality of vanes 18. The positioning feature 19 may be a raised or convex portion of the surface of the distal end 62 of each of the respective vanes 18.

As shown in FIGS. 1-3, the plurality of vanes 18 may include four vanes 18. However, as those skilled in the art will appreciate, the plurality of vanes 18 may include any number of vanes.

The adjustable vane component 12 may be positioned upon a central axis A (FIG. 3). Namely, the vane nexus 16 and the connection feature 20 are aligned along the central axis A and each of the plurality of vanes 18 extends outwardly from the central axis A.

The airflow outlet 10 further includes a backplate 14. The backplate 14 may be formed or molded of a polymeric material or the like. The backplate 14 includes a support tube 22. The backplate 14 further includes a plurality of backplate extensions 26, which extend outwardly from the support tube 22. The support tube 22 comprises the central portion of the backplate 14 and defines a bore 24 therethrough. The bore 24 is configured to receive the connection feature 20 of the adjustable vane component 12 in order to integrally couple the adjustable vane component 12 and the backplate 14.

The plurality of backplate extensions 26 extend outwardly from the support tube 22, such that each of the respective backplate extensions 26 has a proximal end 38 (FIG. 2) integrally connected to the support tube 22 and a distal end 36 removed from the support tube 22. Each of the respective backplate extensions 26 may include a retention feature 34 formed at its distal end 36. The retention feature 34 may be a functional snap-feature, a lip, or the like.

The backplate 14 may further include a plurality of support members 28. Each of the respective support members 28 may be integrally formed and coupled with the support tube 22 and one of the respective backplate extensions 26.

As shown in FIGS. 1-3, the plurality of backplate extensions 26 may include four extensions 26. However, as those skilled in the art will appreciate, the plurality of backplate extensions 26 may include any number of extensions. However, the number of backplate extensions 26 that make up the plurality of backplate extensions 26 shall be equal to the number of vanes 18 that make up the plurality of vanes 18.

The backplate 14 may be positioned upon the central axis A (FIG. 3). Namely, the support tube 22 and the bore 24 defined thereby may be aligned along the central axis A and the plurality of backplate extensions 26 may extend outwardly from the central axis A.

The adjustable vane component 12 and the backplate 14 may be fitted within a vane housing 30 forming a vane assembly 32 (FIG. 2). The vane housing 30 may be sized to encapsulate the integrally coupled adjustable vane component 12 and the backplate 14. The vane housing 30 may be formed or molded of a polymeric material or the like.

Referring to FIGS. 2 and 3, the vane housing 30 may include a first edge 44 and a second edge 46. The vane housing 30 may define a plurality of receiving slots 40 along the second edge 46. Each of the plurality of receiving slots 40 may be configured to receive one of the retention features 34 associated with one of the plurality of backplate extensions 26. The interaction between each respective retention feature 34 and each receiving slot 40 may create a snap-fit engagement, which secures the backplate 14 and the adjustable vane component 12 integrally coupled thereto, within the vane housing 30.

The vane housing 30 may further include a first surface 41 and a second surface 43. The first surface 41 may be an inwardly facing surface, which is in contact with the adjustable vane component 12, and the second surface 43 may be an outwardly facing surface. The vane housing 30 may further define a plurality of retention detents 42 therein. The retention detents 42 may be formed as convex parabolic detents with the apex thereof extending into the second surface 43. Each of the retention detents 42 defined by the vane housing 30 may be configured to receive one of the plurality of positioning features 19 of the adjustable vane component 12, thereby locking the adjustable vane component in a predetermined finite position.

Figure 4A:
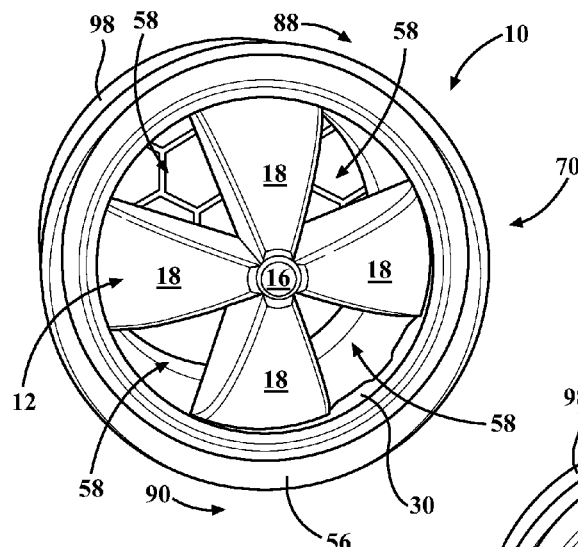
FIG. 4A is a schematic front view of the airflow outlet described in the present disclosure, wherein the airflow outlet occupies a first or full-open position.
Figure 4B:
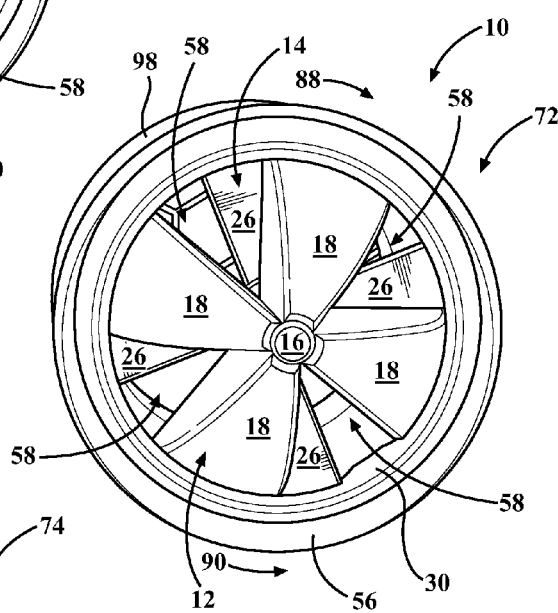
FIG. 4B is a schematic front view of the airflow outlet described in the present disclosure, wherein the airflow outlet occupies a mid-open position.
Figure 4C:
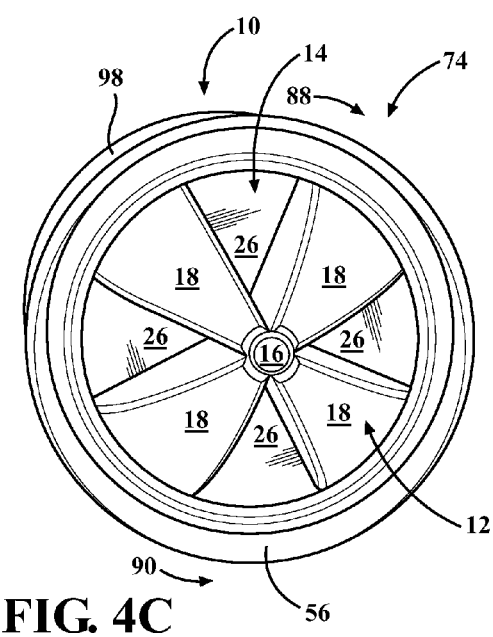
FIG. 4C is a schematic front view of the airflow outlet described in the present disclosure, wherein the airflow outlet occupies a second or full-closed position.

Referring to FIGS. 4A-4C, the backplate 14 is rotationally stationary. When the backplate 14 and the adjustable vane component 12 are coupled together via the support tube 22 and the connection feature 20 and fitted within the vane housing 30 to create the vane assembly 32, the backplate 14 is locked to the vane housing 30 via the snap-fit interaction between the retention features 34 of each of the plurality of backplate extensions 26 and the receiving slots 40 defined by the vane housing 30 (FIGS. 2 and 3).

The adjustable vane component 12 is rotatable about the central axis A (FIG. 3) between a first position 70 (FIG. 4A) and a second position 74 (FIG. 4C), such that the the plurality of vanes maintain a rotational position defined between the first position 70 and the second position 74. The adjustable vane component 12 is rotatable in each of a first direction 88 and a second direction 90. As such, the stationary backplate extensions 26 are configured to selectively align with the plurality of vanes 18 of the adjustable vane component 12, as the adjustable vane component 12 is rotated about the central axis A. Thus, the rotational position of the adjustable vane component 12 with respect to the backplate 14, namely the positioning of each of the respective vanes 18 with respect to each of the associated backplate extensions 26, defines an airflow outlet opening 58, the size of which dictates how much air may pass therethrough and essentially the amount of airflow through the airflow outlet 10 and into the passenger compartment. As shown, the airflow outlet 10, dependent upon the rotational positions of the adjustable vane component 12 and the plurality of vanes 18, may occupy a first or full-open position 70 (FIG. 4A), an intermediate position 72 (FIG. 4B), and a second or full-closed position 74 (FIG. 4C). In the first position 70 the plurality of vanes 18 is completely aligned with the plurality of backplate extensions 26, such that airflow outlet opening 58 is fully open and airflow through the airflow outlet opening 58 is unimpeded. In the second position 74, the plurality of vanes 18 is opposingly positioned with respect to the backplate extensions 26, such that the airflow outlet opening 58 is fully blocked by the plurality of vanes 18, and thus airflow through the airflow outlet opening 58 is prohibited.

In one example, the adjustable vane component 12 may be rotatable to an infinite number of rotational positions between the first position 70 and the second position 74. In another example, the adjustable vane component 12 may be rotatable to a series of finite intermediate positions between the first position 70 and the second position 74.

In such an example, wherein the adjustable vane component 12 is rotatable to a series of finite intermediate positions between the first position 70 and the second position 74, each of the finite intermediate positions may be defined by the positioning of the retention detents 42 defined by the vane housing 30. Each rotational position of the adjustable vane component 12 is defined by and corresponds to the location of a retention detent 42 and positioning feature 19 interaction point, such that the respective retention detents 42 receives the respective positioning feature 19 to hold the adjustable vane component 12 in the respective finite position.

As an illustrative example, wherein the plurality of vanes 18 includes four vanes 18 and the plurality of backplate extensions 26 includes four backplate extensions 26, the retention detents 42 may be positioned upon the vane housing 30 to facilitate a first or full-open position 70 at a 0° rotation, an intermediate mid-open position 72 at a 22.5° rotation, and a second or full-closed position 74 at a 45° rotation.

Referring back to FIGS. 1-3, the airflow outlet 10 may further include a vane assembly sleeve 48, an outlet housing 50, a trim piece 56, and a fitting 98.

The vane assembly 32 may be fitted within a vane assembly sleeve 48, forming an internal rotational component 68. The vane assembly sleeve 48 may be fitted about and placed in contact with the second surface of the vane housing 30. The vane assembly sleeve 48 may be formed of a low-friction polymer, plastic, or resin. The internal rotational component 68 may be inserted within an outlet housing 50.

The outlet housing 50 may be formed of a polymeric material or the like. The outlet housing 50 may be configured to house the vane assembly 32 within the passenger compartment of a vehicle. The outlet housing 50 may have a first forward facing edge 52 and a second rearward facing edge 54. The outlet housing may be fitted with an outlet trim piece 56 at its first edge 52. The outlet housing 50 may be further fitted with a fitting 98 at its second edge 54, such that the fitting 98 may secure and fit-up the airflow outlet 10 within the passenger compartment of a vehicle.

Referring to FIGS. 5A-5D, when the internal rotational component 68 is contained within the outlet housing 50 and is capable of multi-directional rotation therein. As such, the internal rotational component 68 is rotatable between a first vertical position 80 (FIG. 5A) and a second vertical position 82 (FIG. 5B). The internal rotational component 68 is further rotatable between a first horizontal position 84 (FIG. 5C) and a second horizontal position 86 (FIG. 5D). The low-friction material of the vane assembly sleeve 48 allows for the multi-directional rotation capabilities of the vane assembly 32 contained therein within the outlet housing 50. The multi-directional rotation capabilities of the vane assembly 32 and vane assembly sleeve 48 allow the user to direct the flow of air throughout the passenger compartment of a vehicle.

In addition to the other advantages described herein, the airflow outlet 10 of the present disclosure minimizes the amount of components needed within the outlet, which in turn minimizes the size of the airflow outlet 10. Specifically, the airflow outlet 10 is sized to minimize the fore-aft depth D (FIG. 1) thereof, which can be beneficial from an aesthetic design and/or overall HVAC system packaging stand point.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. An airflow outlet comprising:
    an adjustable vane component having a vane nexus, a connection feature extending rearwardly from the vane nexus, and a plurality of vanes extending outwardly from the vane nexus and connection feature;
    a backplate including:
        a support tube defining a bore therethrough, wherein the bore is configured to receive the connection feature of the adjustable vane component; and
        a plurality of backplate extensions configured to selectively align with the plurality of vanes of the adjustable vane component, the plurality of backplate extensions extending outwardly from the support tube, wherein each backplate extension has a proximal end connected to the support tube and a distal end, such that the distal end of each backplate extension defines a retention feature; and
    a vane housing having a first surface, a second surface, a first edge, and a second edge, and defining a plurality of retention slots along the second edge, wherein the adjustable vane component and the backplate are fitted within the vane housing in contact with the first surface, such that each retention feature is received by one of the plurality of receiving slots to secure the backplate within the vane housing;
    wherein the adjustable vane component is rotatable about a central axis between a first position and a second position, such that a rotational position of the plurality of vanes with respect to the plurality of backplate extensions defines an airflow outlet opening through which air may flow.

2. The airflow outlet of claim 1 wherein in the first position the plurality of vanes is fully aligned with the plurality of backplate extensions, such that airflow through the airflow outlet opening is unimpeded by the plurality of vanes.

3. The airflow outlet of claim 1 wherein in the second position the plurality of vanes is opposingly positioned with respect to the plurality of backplate extensions, such that airflow through the airflow outlet opening is fully blocked by the plurality of vanes.

4. The airflow outlet of claim 1 wherein each of the plurality of vanes has a proximal end connected to the vane nexus and the connection feature and a distal end; and wherein each of the plurality of vanes further defines a positioning feature formed on its distal end.

5. The airflow outlet of claim 4 wherein the vane housing defines a plurality of retention detents therein; and wherein each of the plurality of retention detents is configured to receive one of the plurality of positioning features formed on one of the plurality of vanes, such that when the respective retention detent receives one of the plurality of positioning features an interaction is formed therebetween.

6. The airflow outlet of claim 5 wherein the interactions between each of the plurality of retention detents and each of the respective positioning features defines the rotational position of the plurality of vanes.

7. The airflow outlet of claim 1 wherein the vane assembly is fitted within a vane assembly sleeve, such that the vane assembly sleeve is fitted about the vane housing and in contact with the vane housing second surface; and wherein the vane assembly fitted within the vane assembly sleeve forms an internal rotational component.

8. The airflow outlet of claim 7 further including an outlet housing having a first edge and a second edge, wherein the outlet housing is configured to house the internal rotational component, such that the internal rotational component is fitted within the outlet housing.

9. The airflow outlet of claim 8 wherein the internal rotation component is rotatable within the outlet housing between a first vertical rotation position and a second vertical rotation position.

10. The airflow outlet of claim 8 wherein the internal rotation component is rotatable within the outlet housing between a first horizontal rotation position and a second horizontal rotation position.

11. The airflow outlet of claim 8 further including an outlet trim piece fitted to the first edge of the outlet housing.

\* \* \* \* \*